United States Patent
Greer et al.

(10) Patent No.: US 12,099,614 B2
(45) Date of Patent: Sep. 24, 2024

(54) SECRETS SWAPPING IN CODE

(71) Applicant: International Business Machines Corporation, Armonk, NY (US)

(72) Inventors: Alexander Leblanc Greer, Austin, TX (US); Pratheek Karnati, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 17/481,403

(22) Filed: Sep. 22, 2021

(65) Prior Publication Data
US 2023/0088524 A1 Mar. 23, 2023

(51) Int. Cl.
G06F 21/00 (2013.01)
G06F 8/70 (2018.01)
G06F 21/57 (2013.01)
G06F 8/60 (2018.01)

(52) U.S. Cl.
CPC .............. *G06F 21/577* (2013.01); *G06F 8/70* (2013.01); *G06F 8/60* (2013.01); *G06F 2221/033* (2013.01)

(58) Field of Classification Search
CPC . G06F 21/577; G06F 8/70; G06F 8/60; G06F 2221/033; G06F 21/14; G06F 21/12; G06F 21/125
See application file for complete search history.

(56) References Cited

U.S. PATENT DOCUMENTS

| | | | |
|---|---|---|---|
| 7,398,517 B2 | 7/2008 | Berg et al. | |
| 9,160,762 B2 | 10/2015 | Brake et al. | |
| 9,467,477 B2 | 10/2016 | Cabrera et al. | |
| 9,894,069 B2 | 2/2018 | Weaver et al. | |
| 9,967,319 B2 | 5/2018 | Savelieva et al. | |
| 9,971,896 B2 | 5/2018 | Amit et al. | |
| 10,585,682 B2 | 3/2020 | Jain et al. | |
| 2008/0196101 A1* | 8/2008 | Sade | G06F 21/33 726/22 |
| 2009/0060178 A1* | 3/2009 | Montgomery | H04L 9/083 726/3 |
| 2010/0146600 A1 | 6/2010 | Eldar et al. | |
| 2012/0079571 A1 | 3/2012 | Evan et al. | |
| 2020/0065476 A1* | 2/2020 | Boutnaru | G06F 21/46 |
| 2021/0240834 A1* | 8/2021 | Trabelsi | G06N 20/20 |
| 2022/0365777 A1* | 11/2022 | Makmel | G06F 8/73 |

OTHER PUBLICATIONS

Calles, "Secrets Management." Serverless Security. Apress, Berkeley, CA, 2020. 199-227, Chapter 8.
Karthiga et al., "Detection of Vital Parameters using Cloud Computing Technology." 2020 International Conference on Communication and Signal Processing (ICCSP). IEEE, 2020, 4 pages.
Mell et al., "The NIST Definition of Cloud Computing", Recommendations of the National Institute of Standards and Technology, Special Publication 800-145, Sep. 2011, 7 pages.

* cited by examiner

*Primary Examiner* — Yogesh Paliwal
(74) *Attorney, Agent, or Firm* — Scott S. Dobson (57) ABSTRACT

A method, system, and computer program product are provided for swapping secrets in source code. One or more secrets in source code are identified by scanning the source code. The set of the one or more secrets are exported to a secrets manager. A reference ID for each secret in the set of the one or more secrets is received from the secrets manager. The source code is injected to replace each secret from the set of the one or more secrets with the corresponding reference ID.

20 Claims, 5 Drawing Sheets

SECRETS SWAPPING IN CODE

BACKGROUND

The present disclosure relates to code vulnerability analysis, and more specifically, to identifying and remediating vulnerabilities in source code.

Applications and services sometimes require private and/or confidential information during runtime. For example, an application may need private credentials to access a secure database. However, this information may be vulnerable if it is included in the source code or configuration files when the code is pushed into publicly accessible environments.

SUMMARY

According to embodiments of the present disclosure, a method for swapping secrets in source code is provided. One or more secrets in source code are identified by scanning the source code. The set of the one or more secrets are exported to a secrets manager. A reference ID for each secret in the set of the one or more secrets is received from the secrets manager. The source code is injected to replace each secret from the set of the one or more secrets with the corresponding reference ID. Embodiments of the present disclosure further provide a computer program product and a system for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to secrets swapping in source code. While the present disclosure is not necessarily limited to such applications, various aspects of the disclosure may be appreciated through a discussion of various examples using this context.

When developing applications, services, etc., it is not uncommon that enterprise developers will accidentally include secret or sensitive information such as digital credentials (e.g., API key, username/password, etc.) that allow for access to services and push the code into publicly accessible environments. This represents a potentially serious vulnerability if the secret or sensitive information were to fall into the hands of a malicious actor.

Embodiments of the present disclosure provide methods, systems, and computer program products for exporting secrets to a secrets manager service, receiving a reference ID for secret from the secrets management service, and injecting code to replace the secret with the reference ID. At runtime, the application can retrieve the secrets using the corresponding reference IDs as needed. This provides the application access to the secrets that may be required by the application while preventing unauthorized users from accessing the secrets by examining the code. One or more aspects described herein may be implemented as part of a DevOps or continuous integration and continuous delivery and/or deployment (CI/CD) pipeline.

As used herein, a secret may be any data that is private and/or confidential. For example, a secret may include credentials (such as Username/Password or Key/Value pairs) for accessing an entity such as a database, cloud object storage (COS) bucket or cloud service. The secret may include the credential and/or a public reference for the entity where the credential is to be used. A secret may also include Secure Shell Protocol (SSH), Application Programing Interface (API), Asymmetric and Symmetric keys, Secure Sockets Layer (SSL)/Transport Layer Security (TLS) certificates, and DB Configurations. In some embodiments, a secret may include personal information or personally identifiable information.

According to embodiments of the present disclosure, secrets may be identified in the source code and/or configuration files by scanning the code. There are existing code scanning tools for identifying secrets in source code/configuration files using secrets detection algorithms. For example, the code may be scanned by a code scanning tool to identify entities that the application needs a secret to consume and the secrets may be identified using library syntax corresponding the entities. These code scanning tools may scan through the code to identify and flag the secrets. The code may be scanned in response to a developer committing the code to a code repository.

The flagged secrets may be presented to a user with an action to export the secrets to a secrets manager. The flagged secrets may include some false positives (i.e., data that is not private or confidential may be flagged). Thus, in some embodiments, the user may be provided with an interface to select/deselect specific data that was flagged for exporting to a secrets manager. The user may be provided with a selectable action to export the selected secrets to a secrets manager. In other embodiments, the flagged secrets are automatically exported to a secrets manager without user notification or intervention.

An instance of a secrets manager may be identified and the secrets may be exported to the secrets manager instance. The specific secrets manager may predetermined. An account associated with the developer may be identified for the secrets manager. Exporting the secrets to the secrets manager may occur automatically or in response to receiving an action from the user. The secrets that are exported may include all the secrets that were flagged or may include a subset of the flagged secrets that were selected by a user.

For each secret, the secrets manager may securely store the secret and generate a reference ID that may be used to retrieve the secret. The reference ID may be a unique value that is associated with the secret by the secrets manager. The reference IDs for each secret may be injected into the source code/configuration files to replace the corresponding secret. The source code/configuration files may also be injected to include the location of the secrets manager where the reference ID can be used to retrieve the corresponding secret.

After the code has been injected with the reference IDs, a report may be generated that identifies the changes that were made. For example, the report may include the additions to the code and the code that was removed. This report may be provided to the user or may be stored to maintain a record.

When the code is the deployed to a compute node or a public repository, it will no longer contain the secrets that were exported to the secrets manager. Thus, the secrets are not disclosed by viewing the code. When the application needs the secret such as to access a database, the application may retrieve the secret at runtime from the secrets manager using the reference ID. The application may authenticate itself with the secrets manager to be able to retrieve the secret using the reference ID. An administrator for the secrets manager account may approve the application to access the secrets.

For example, an enterprise developer may be about to deploy code to production that unintentionally includes a private username and password for accessing a secure database. The developer commits the code to a code repository such as GITHUB. In response to the new code, a CI/CD system invokes a code scanning tool to identify secrets. The username and password are flagged by the code scanning tool. The CI/CD system generates a report showing the flagged username and password. The CI/CD system provides the report to the developer along with a selectable action to export the username and password to a secrets manager. In response to receiving the developer's selection to export the username and password, the CI/CD system identifies a secrets manager instance associated with the developer and exports the username and password to the secrets manager. The secrets manager securely stores the username and password and returns a reference ID to the CI/CD system. The CI/CD system injects the code to replace the username and password with the reference ID. The CI/CD system generates a report showing the changes made to the code and provides the report to the developer. The username and password are not exposed when the code is eventually deployed. When the application needs the username and password to access the secure database during runtime, the application retrieves the username and password from the secrets manager using the reference ID.

Figure 1:
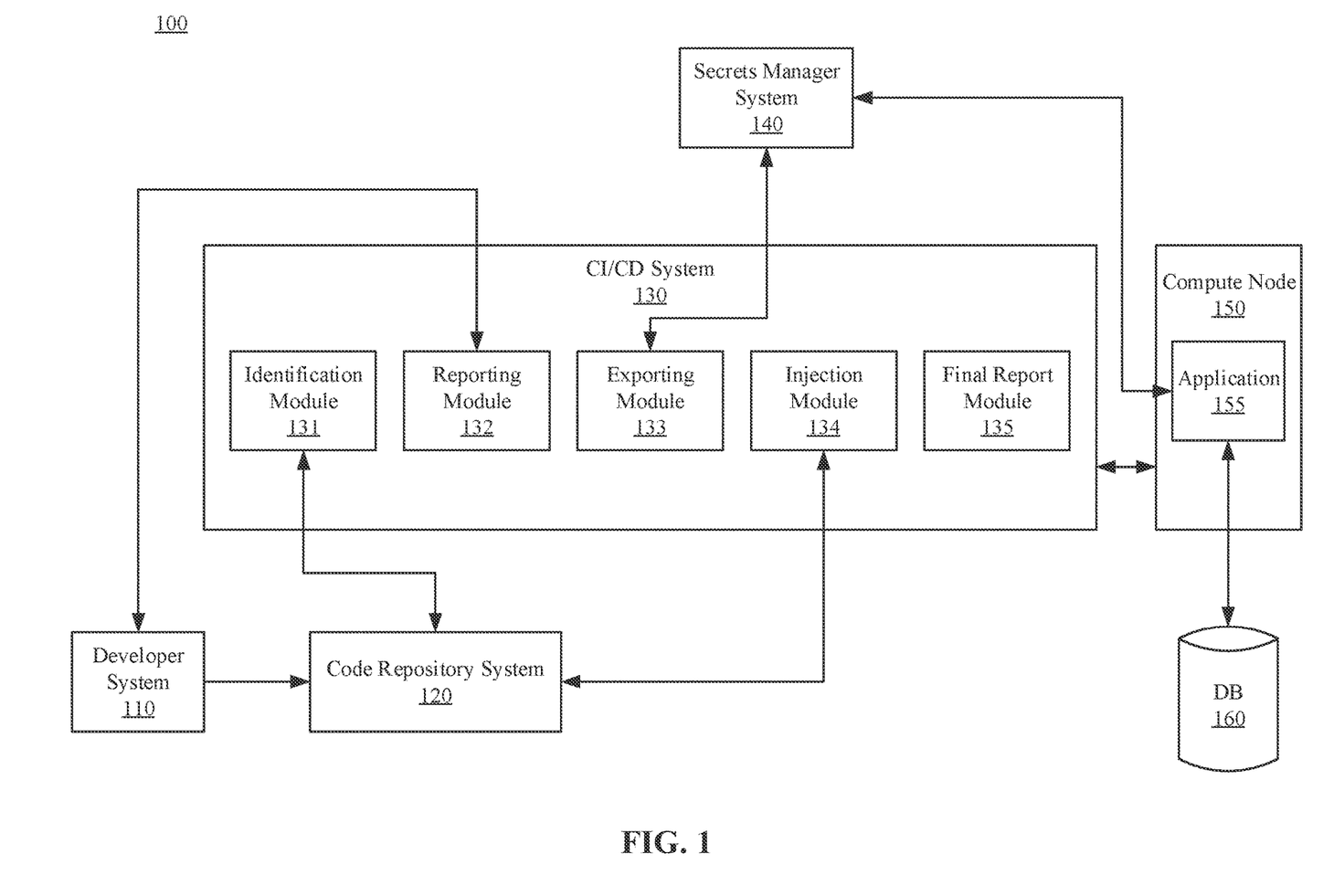
FIG. 1 depicts a computing environment according to embodiments of the present disclosure.

Referring now to FIG. 1, a computing environment 100 according to embodiments of the present disclosure is depicted. Environment 100 includes a developer system 110, code repository system 120, CI/CD system 130, secrets manager system 140, compute node 150, and database 160. CI/CD system includes identification module 131, reporting module 132, exporting module 133, injection module 134, and final report module 135. The depicted modules 131-135 may be part of a CI/CD pipeline containing other automated tools for application building, testing, and deployment.

CI/CD system 130 may take actions in response to new code being committed to code repository system 120 by developer system 110. The CI/CD system may be notified of the new code by the code repository 120 or the developer system 110. Identification module 131 may scan the code to identify and flag one or more secrets in the code.

The flagged secrets may be provided to reporting module 132 which generates a report for the developer. The report may identify the secrets that have been flagged and provide an action to export the secrets to a secrets manager. For example, the report may be provided to the developer system over one or more networks through a web browser. The report may contain a user interface element that is selectable by the developer to communicate to the CI/CD system 130 to export the secrets to the secrets manager system 140. In some embodiments, the report may provide the developer with the ability to select and/or deselect secrets that were flagged such that only a subset of the flagged secrets are exported to a secrets manager in response to the user selecting the action to export the secrets.

In response to receiving the selection of the action to export the secrets from developer system 110, exporting module 133 may export a set of flagged secrets to secrets manager system 140. As described above, the set of flagged secrets may include all of the flagged secrets or a subset selected by the developer. Exporting module 133 may export the secrets to the secrets manager system 140. Exporting module 133 may communicate the secrets to the secrets manager system over one or more networks. Exporting module 133 may identify an instance of a secrets manager associated with the developer on secrets manager system 140. Secrets manager system 140 may securely store the secrets received from exporting module 133 and generate a reference ID for each secret that may be used to retrieve the respective secret. Secrets manager system 140 may communicate the reference IDs corresponding to the exported secrets to exporting module 133.

Injection module 134 may inject the reference IDs into the code to replace the secrets. For example, the injection module may communicate with code repository 120 over one or more networks to remove each secret and replace the secret with the corresponding reference ID. Additionally, injection module 134 may inject the location of the secrets manager instance that contains the corresponding secret in the code with the reference ID.

Final report module 135 may generate a report identifying each of the changes made to the code to replace the secrets with the reference IDs. In some embodiments, the report may be communicated to developer system 110. In some embodiments, the report may be stored on CI/CD system 130 to retain a record for later review.

After injecting the code, CI/CD system 130 may perform one or more additional processes as part of the CI/CD pipeline. Eventually, CI/CD system 130 may deploy the changes to the code to compute node 150 containing application 155 corresponding to the code. At runtime, application 155 may retrieve the secrets as needed from secrets manager system 140 using the corresponding reference IDs. Since the secrets have been replaced in the code, someone viewing the code will be unable to identify the secrets.

Each of the systems depicted may be implemented by a suitable computing device. For example, each of the systems may be implemented by a computer system such as computer system 301 described in reference to FIG. 3. In some embodiments, one or more of the systems may be implemented in a cloud environment.

Each of the systems depicted have been described as separate entities communicating with each other over one or more networks. However, in other embodiments, different depicted entities may a single entity. For example, in some embodiments, the CI/CD system may include the code repository or the secrets manager. In some embodiments, one or more of the depicted systems may be implemented in the same cloud computing environment. CI/CD system 130 is depicted as containing modules 131-135. However, in other embodiments, the CI/CD system may contain more or fewer modules. Further, in some embodiments, one or more of the modules may be part of a different system. As used herein, a module may be any combination of hardware and software configured to implement one or more logical functions.

Figure 2:
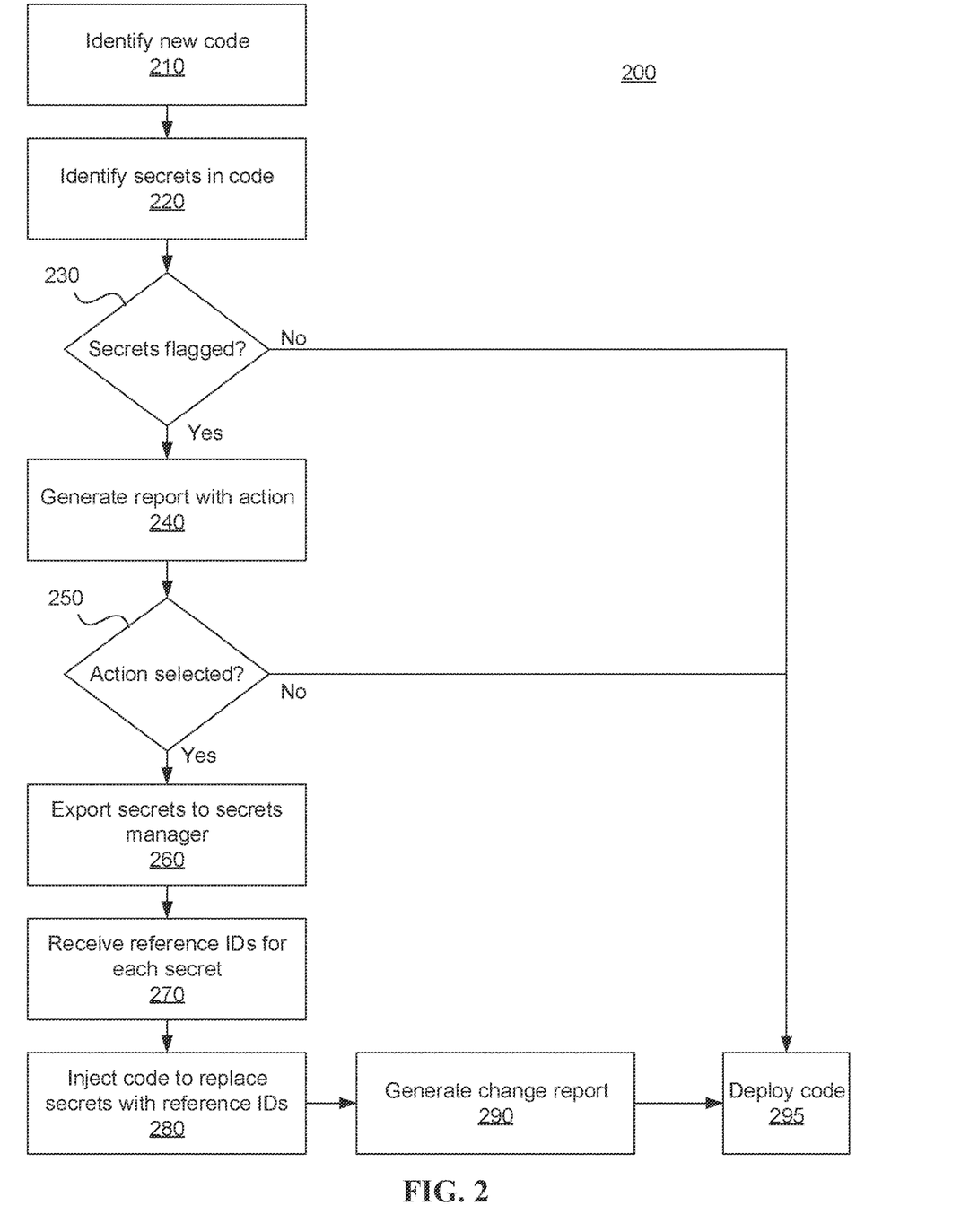
FIG. 2 depicts a flow diagram of an example method for secrets swapping in code according to embodiments of the present disclosure.

Referring now to FIG. 2, a flow diagram of an example method 200 for swapping secrets with reference IDs in code is depicted. Method 200 may be performed by one or more computer systems executing automated processes that are part of a DevOps or CI/CD pipeline. At operation 210, new code is identified. The new code may be identified in response to the code being committed to a code repository.

At operation 220, secrets in the code may be identified and flagged. A code scanning tool may be utilized to identify and flag secrets in the code.

At operation 230, it is determined whether any secrets were flagged in the code. If at operation 230 no secrets have been flagged, the code may be deployed at operation 295. If at operation 230 one or more secrets were flagged, a report indicating the flagged secrets may be generated and communicated to a user with an action to export the flagged secrets to a secrets manager at operation 240.

At operation 250, it is determined whether the user has selected the action to export the secrets. If at operation 250 the user does not select the action to export the secrets, the code may be deployed at operation 295. If at operation 250, the user has selected the action to export the secrets, the secrets may be exported to the secrets manager for secure storage at operation 260.

At operation 270, a reference ID for retrieving each of the exported secrets may be received from the secrets manager. The reference ID may be a unique value associated with a secret at the secrets manager, such that the reference ID may be used to retrieve the secret from the secrets manager.

At operation 280, the code may be injected to replace the secrets with their respective reference IDs. The code may also be injected to include a location of the secrets manager to retrieve the corresponding secret using a reference ID.

At operation 290, a report may be generated showing the changes that were made to the code. The report may be provided to a user or may be stored to maintain a record. The report may show the code prior to the injection, code after the injection, and highlight the parts that changed. At operation 295, the new code may be deployed. For example, the new code may be deployed to a computing system for executing the code. In some embodiments, the computing system may be a cloud computing environment. In some embodiments, the computing system may be a server. In some embodiments, the code may be placed in a public repository accessible to other users. Although not depicted, one or more operations as part of a CI/CD pipeline may be performed before deploying the code.

Figure 3:
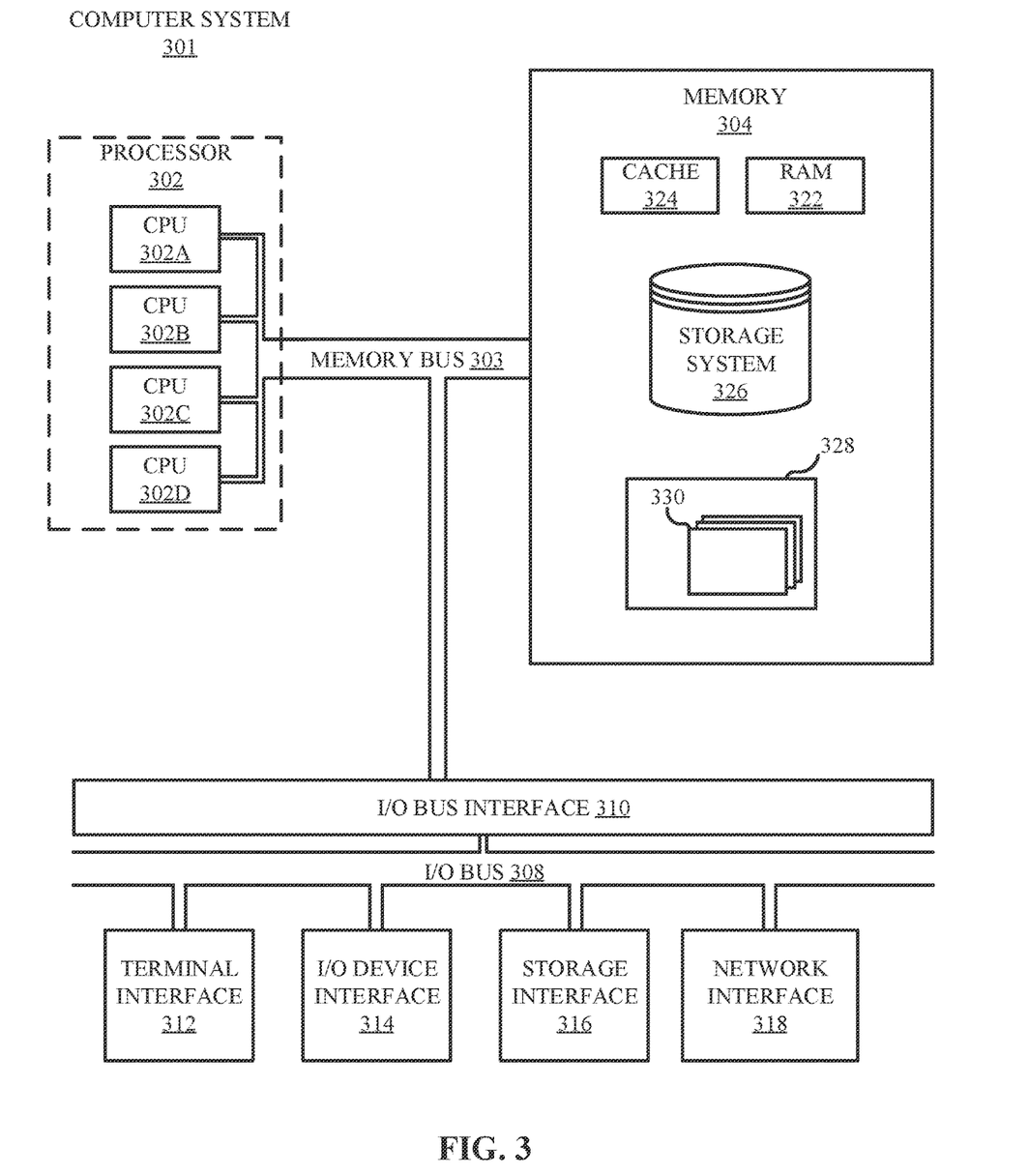
FIG. 3 depicts a high-level block diagram of an example computer system in accordance with embodiments of the present disclosure.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 330 generally perform the functions or methodologies of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
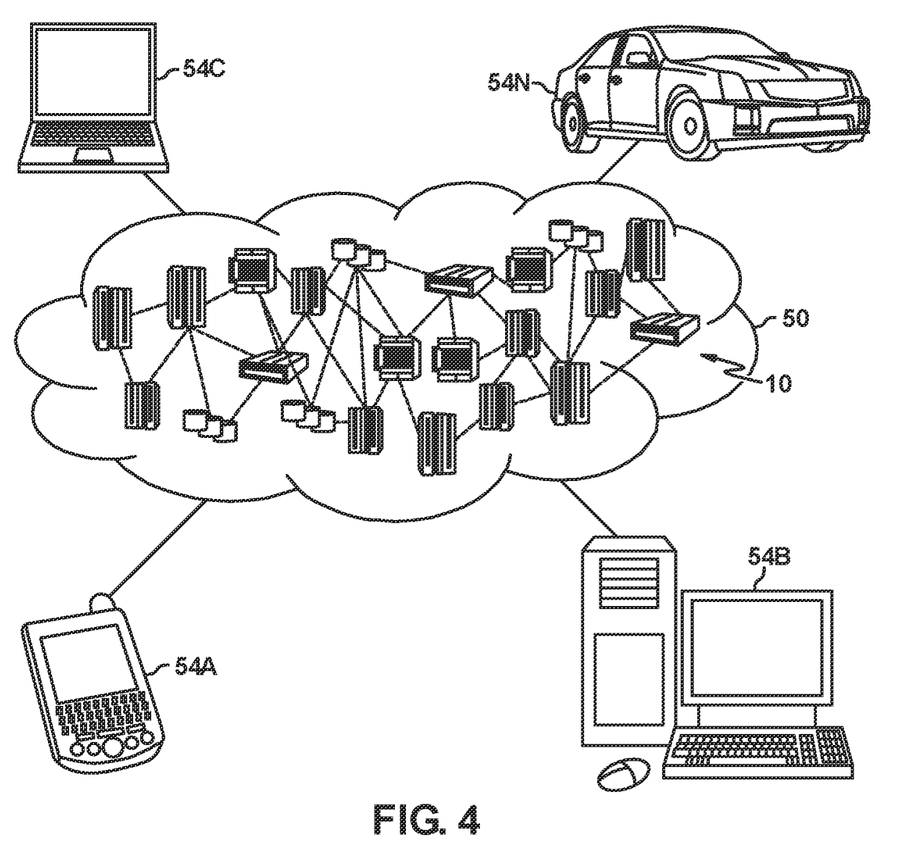
FIG. 4 depicts a cloud computing environment according to an embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
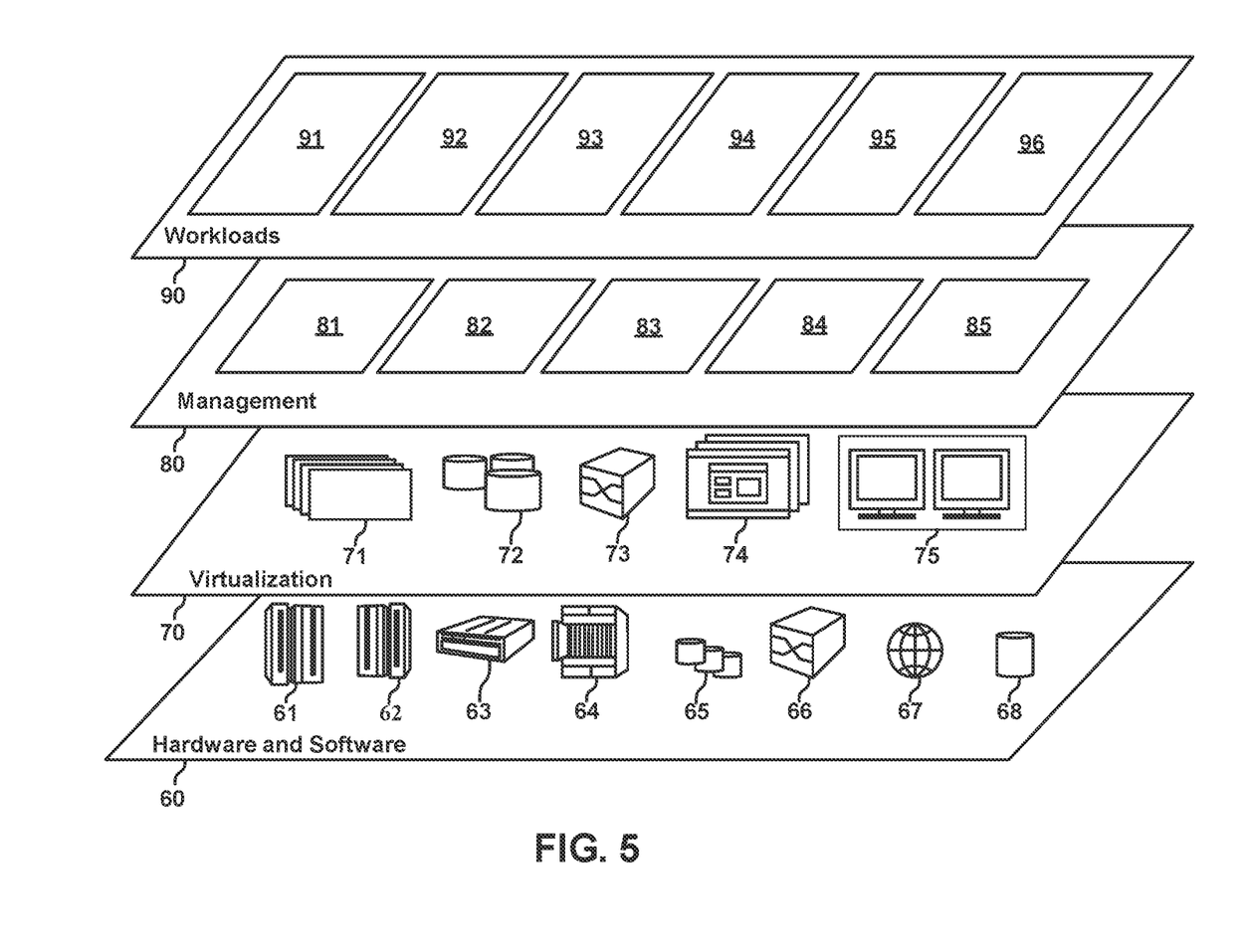
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secrets swapping in code 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   identifying one or more secrets in source code by scanning the source code;
   in response to the identifying one or more secrets, presenting the one or more secrets to the user on a user interface, wherein the one or more secrets are selectable;
   in response to receiving a selection of a set of the one or more secrets from the user, exporting the set of the one or more secrets to a secrets manager;
   receiving a reference ID for each secret in the set of the one or more secrets from the secrets manager; and
   injecting the source code to replace each secret from the set of the one or more secrets with the corresponding reference ID and a location of the secrets manager.

2. The method of claim 1,
   wherein the user interface presents a selectable action to a user to export the set of the one or more secrets to the secrets manager, wherein the exporting the set of the one or more secrets occurs in response to receiving a selection of the action from the user.

3. The method of claim 2, wherein the set of the one or more secrets is less than all of the one or more secrets.

4. The method of claim 1, further comprising generating a report identifying each change made to the source code during the injecting the source code.

5. The method of claim 1, wherein the one or more secrets includes a credential to access an entity.

6. The method of claim 5, wherein the entity is a database.

7. The method of claim 1, further comprising, after the injecting, deploying the source code to a compute node.

8. A computer program product comprising one or more computer readable storage medium having program instructions embodied therewith, the program instructions executable by a processor to cause the processor to perform operations comprising:
 identifying one or more secrets in source code by scanning the source code;
 in response to the identifying one or more secrets, presenting the one or more secrets to the user on a user interface, wherein the one or more secrets are selectable;
 in response to receiving a selection of a set of the one or more secrets from the user, exporting the set of the one or more secrets to a secrets manager;
 receiving a reference ID for each secret in the set of the one or more secrets from the secrets manager; and
 injecting the source code to replace each secret from the set of the one or more secrets with the corresponding reference ID and a location of the secrets manager.

9. The computer program product of claim 8, wherein the user interface presents a selectable action to a user to export the set of the one or more secrets to the secrets manager, wherein the exporting the set of one or more secrets occurs in response to receiving a selection of the action from the user.

10. The computer program product of claim 9, wherein the set of the one or more secrets is less than all of the one or more secrets.

11. The computer program product of claim 8, wherein the operations further comprise generating a report identifying each change made to the source code during the injecting the source code.

12. The computer program product of claim 8, wherein the one or more secrets includes a credential to access an entity.

13. The computer program product of claim 12, wherein the entity is a database.

14. The computer program product of claim 8, wherein the operations further comprise, after the injecting, deploying the source code to a compute node.

15. A system comprising:
 one or more processors; and
 one or more computer readable storage medium having program instructions executable by the one or more processors to perform operations comprising:
  identifying one or more secrets in source code by scanning the source code;
  in response to the identifying one or more secrets, presenting the one or more secrets to the user on a user interface, wherein the one or more secrets are selectable;
  in response to receiving a selection of a set of the one or more secrets from the user, exporting the set of the one or more secrets to a secrets manager;
  receiving a reference ID for each secret in the set of the one or more secrets from the secrets manager; and
  injecting the source code to replace each secret from the set of the one or more secrets with the corresponding reference ID and a location of the secrets manager.

16. The system of claim 15, wherein
 the user interface presents a selectable action to a user to export the set of the one or more secrets to the secrets manager, wherein the exporting the set of the one or more secrets occurs in response to receiving a selection of the action from the user.

17. The system of claim 16, wherein the set of the one or more secrets is less than all of the one or more secrets.

18. The system of claim 15, wherein the operations further comprise generating a report identifying each change made to the source code during the injecting the source code.

19. The system of claim 15, wherein the one or more secrets includes a credential to access an entity.

20. The system of claim 15, wherein the operations further comprise, after the injecting, deploying the source code to a compute node.

* * * * *